(12) United States Patent
Sohn et al.

(10) Patent No.: US 10,687,049 B2
(45) Date of Patent: Jun. 16, 2020

(54) BACK LIGHT APPARATUS, DISPLAY APPARATUS HAVING THE BACK LIGHT APPARATUS, AND CONTROL METHOD FOR THE DISPLAY APPARATUS

(71) Applicant: SAMSUNG ELECTRONICS CO., LTD., Suwon-si (KR)

(72) Inventors: Sang Hyun Sohn, Suwon-si (KR); Dae-Hee Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/702,022

(22) Filed: Sep. 12, 2017

(65) Prior Publication Data
US 2018/0160107 A1    Jun. 7, 2018

(30) Foreign Application Priority Data
Dec. 6, 2016  (KR) .................. 10-2016-0165025

(51) Int. Cl.
| | |
|---|---|
| *H04N 13/117* | (2018.01) |
| *H04N 13/32* | (2018.01) |
| *G02F 1/29* | (2006.01) |
| *F21V 8/00* | (2006.01) |
| *H04N 13/139* | (2018.01) |

(Continued)

(52) U.S. Cl.
CPC ............. *H04N 13/32* (2018.05); *G02B 6/005* (2013.01); *G02B 6/0036* (2013.01); *G02F 1/29* (2013.01); *H04N 13/117* (2018.05); *H04N 13/139* (2018.05); *H04N 13/359* (2018.05); *H04N 13/398* (2018.05); *G02B 6/0058* (2013.01); *G02B 6/0068* (2013.01); *G02B 6/0076* (2013.01); *H04N 2213/001* (2013.01)

(58) Field of Classification Search
None
See application file for complete search history.

(56) References Cited

U.S. PATENT DOCUMENTS

| | | | |
|---|---|---|---|
| 2011/0102651 A1* | 5/2011 | Tay .................. | H01L 27/14625 348/280 |
| 2011/0187764 A1* | 8/2011 | Bae ......................... | G09G 5/10 345/697 |
| 2014/0111856 A1 | 4/2014 | Brug et al. | |

(Continued)

FOREIGN PATENT DOCUMENTS

| | | |
|---|---|---|
| KR | 10-2005-0017186 A | 2/2005 |
| KR | 10-2012-0081651 A | 7/2012 |
| WO | 2016/111708 A1 | 7/2016 |

OTHER PUBLICATIONS

International Search Report, issued by International Searching Authority in corresponding International Application No. PCT/KR2017/010601, dated Jan. 12, 2018, (PCT/ISA/210).

*Primary Examiner* — William C Vaughn, Jr.
*Assistant Examiner* — Joseph Daniel A Towe
(74) *Attorney, Agent, or Firm* — Sughrue Mion, PLLC

(57) ABSTRACT

A back light apparatus includes a plurality of light sources configured to generate light; and a light guide part, wherein the light guide part includes a light guide plate configured to change a path of the light; a first pattern part disposed on a first surface of the light guide plate and configured to emit the light in a first direction; and a second pattern part disposed on a second surface of the light guide plate and configured to emit the light in a second direction.

14 Claims, 16 Drawing Sheets

(51) Int. Cl.
*H04N 13/359* (2018.01)
*H04N 13/398* (2018.01)

(56) References Cited

U.S. PATENT DOCUMENTS

| | | | |
|---|---|---|---|
| 2014/0143733 A1* | 5/2014 | Jung | G06F 3/04815 |
| | | | 715/848 |
| 2014/0204612 A1* | 7/2014 | Song | G02B 6/0036 |
| | | | 362/611 |
| 2014/0368907 A1 | 12/2014 | Minami | |
| 2016/0150221 A1* | 5/2016 | Lee | G02B 6/0045 |
| | | | 348/59 |

* cited by examiner

BACK LIGHT APPARATUS, DISPLAY APPARATUS HAVING THE BACK LIGHT APPARATUS, AND CONTROL METHOD FOR THE DISPLAY APPARATUS

CROSS-REFERENCE TO RELATED APPLICATION(S)

This application claims priority from Korean Patent Application No. 10-2016-0165025, filed on Dec. 6, 2016, in the Korean Intellectual Property Office, the disclosure of which is incorporated herein in its entirety by reference.

BACKGROUND

1. Field

Embodiments of the disclosure relate to a back light apparatus, a display apparatus including the same, and a method of controlling the display apparatus.

2. Description of the Related Art

A display apparatus that converts acquired or stored electrical information into visual information and displays the visual information to a user has been widely used in various fields, for example, at home and in a workplace.

The display apparatus may output an image by using various display devices. Examples of the display devices include a cathode ray tube (CRT), a liquid crystal display (LCD), a light emitting diode (LED), an organic light emitting diode (OLED), an active-matrix organic light emitting diode, or E-paper.

Examples of display apparatuses are televisions, various audio/video systems, computer monitors, navigation devices, or various portable terminal devices such as laptop computers, smartphones, tablet personal computers (PCs), personal digital assistants (PDAs), or cellular phones. In addition, various devices widely used in various industrial fields to display still images or moving images may also be regarded as display apparatuses.

SUMMARY

One or more exemplary embodiments provide a back light apparatus realizing a two-dimensional (2D) image and a three-dimensional (3D) image with no glasses by using a light guide plate, a display apparatus including the same, and a method of controlling the display apparatus.

Additional aspects of the disclosure will be set forth in part in the description which follows and, in part, will be obvious from the description, or may be learned by practice of the disclosure.

In accordance with one aspect of the disclosure, there is provided a back light apparatus including: a plurality of light sources configured to generate light; and a light guide part, wherein the light guide part includes a light guide plate configured to change a path of the light; a first pattern part disposed on a first surface of the light guide plate and configured to emit the light in a first direction; and a second pattern part disposed on a second surface of the light guide plate and configured to emit the light in a second direction.

The light guide part may include an optical device having a first region corresponding to the first pattern part and a second region corresponding to the second pattern part, The optical device may activate at least one of the first region and the second region and emits the light in at least one of the first direction and the second direction.

The optical device may include a first electrode corresponding to the first region and a second electrode corresponding to the second region, The light guide part may change the path of the light based on the electric power supplied to at least one of the first electrode and the second electrode and emits the light.

The optical device may include a liquid crystal unit activated based on the electric power supplied to at least one of the first electrode and the second electrode.

The first pattern part may include a plurality of first unit patterns arranged in parallel and spaced apart from each other at a predetermined first pitch.

The second pattern part may include a plurality of second unit patterns arranged in parallel and spaced apart from each other at a predetermined second pitch.

In accordance with one aspect of the disclosure, there is provided a display apparatus including: an input unit; a back light apparatus configured to emit light; a display panel configured to display an image using the light; and a controller configured to display the image on the display panel by controlling a direction of the emitted light in response to a command of a user being input via the input unit. The back light apparatus includes: a plurality of light sources configured to generate the light; and a light guide part, wherein the light guide part includes: a light guide plate configured to change a path of the light and emit the light; a first pattern part disposed on a first surface of the light guide plate and configured to emit the light in a first direction; and a second pattern part disposed on a second surface of the light guide plate and configured to emit the light in a second direction.

In response to a user command related to a three-dimensional (3D) image being input via the input unit, the controller may display the 3D image on the display panel by emitting the light in one of the first direction and the second direction.

In response to a user command related to a two-dimensional (2D) image being input via the input unit, the controller may display the 2D image on the display panel by emitting the light in the first direction and the second direction.

In response to a user command related to a 3D image and a command related to a viewing point of the image being input via the input unit, the controller may display the 3D image on the display panel by emitting the light in one of the first direction and the second direction.

In response to a user command related to a resolution of the image being input via the input unit, the controller may display the image on the display panel by emitting the light in at least one of the first direction and the second direction.

The first pattern part may include a plurality of first unit patterns arranged in parallel and spaced apart from each other at a predetermined first pitch, a first unit pattern having a preset first width, and the second pattern part may include a plurality of second unit patterns arranged in parallel and spaced apart from each other at a predetermined second pitch, a second unit pattern having a preset second width.

Each of the predetermined first pitch and the predetermined second pitch may be determined based on at least one of a thickness of the light guide plate, an interval between pixels constituting the image, and a distance between the display panel and the user.

Each of the preset first width and the preset second width may be determined based on a number of viewing points of the image and the predetermined first pitch or the predetermined second pitch respectively corresponding to the preset first width or the preset second width.

In accordance with one aspect of the disclosure, there is provided a method of controlling a display apparatus, the method including: receiving a command of a user; emitting light in at least one of a first direction and a second direction in response to the command of the user; and displaying an image based on the emitted light.

The receiving of the command may include receiving a user command related to a 3D image, and the displaying of the image may include displaying the 3D image by emitting the light in one of the first direction and the second direction in response to the user command related to the 3D image.

The receiving of the command may include receiving a user command related to a 2D image, and the displaying of the image may include displaying the 2D image by emitting the light in the first direction and the second direction in response to the user command related to the 2D image.

The receiving of the command may include receiving a user command related to a viewing point of the image, and the displaying of the image may include displaying the image by emitting the light in one of the first direction and the second direction in response to the user command related to the viewing point of the image.

The receiving of the command may include receiving a user command related to a resolution of the image, and the displaying of the image may include displaying the image by emitting the light in at least one of the first direction and the second direction in response to the user command related to the resolution of the image.

BRIEF DESCRIPTION OF THE DRAWINGS

These and/or other aspects of the disclosure will become apparent and more readily appreciated from the following description of the exemplary embodiments, taken in conjunction with the accompanying drawings.

DETAILED DESCRIPTION

Figure 1:
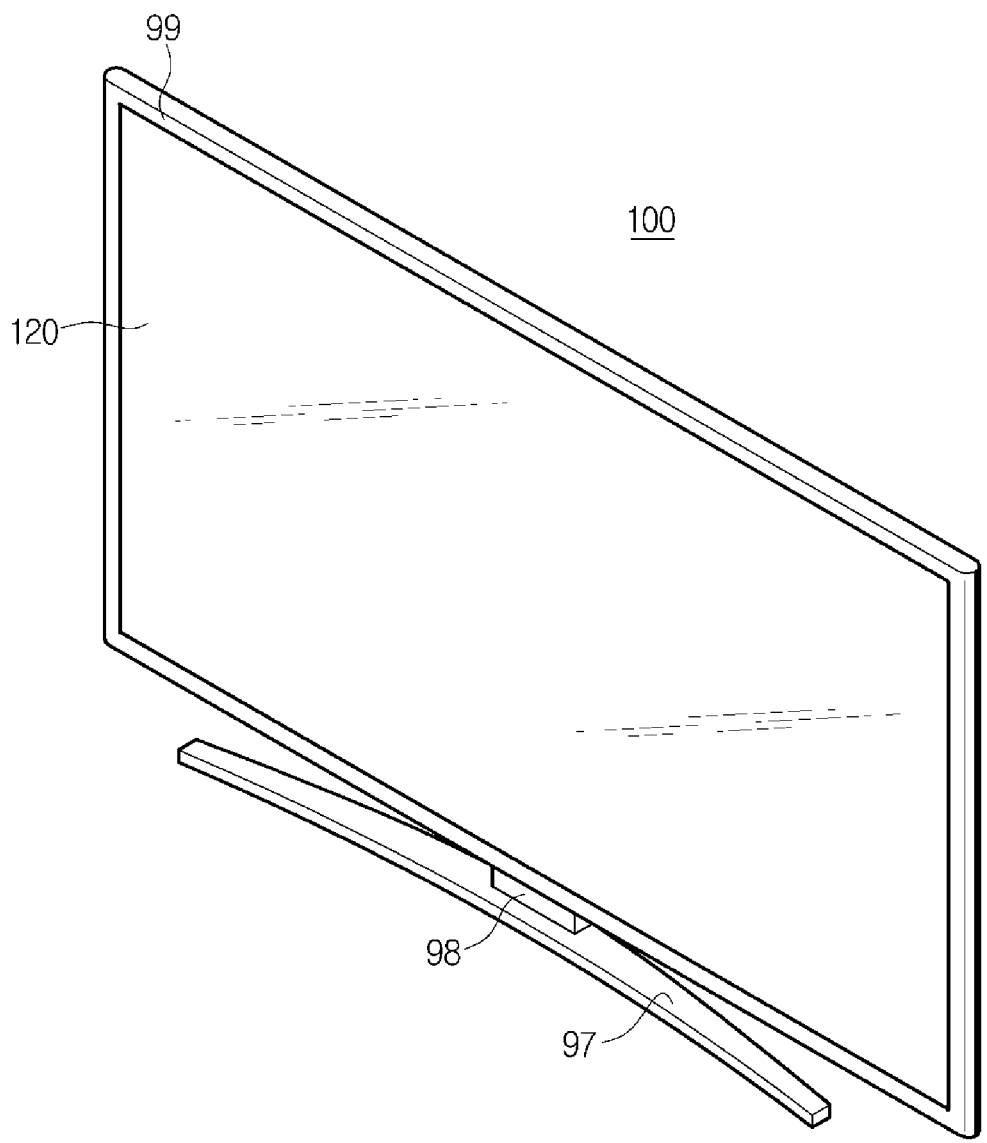
FIG. 1 is a perspective view illustrating a display apparatus according to an exemplary embodiment.

Reference will now be made in detail to the exemplary embodiments of the disclosure, examples of which are illustrated in the accompanying drawings, wherein like reference numerals refer to like elements throughout. This specification does not describe all elements of the exemplary embodiments of the disclosure and detailed descriptions on what are well known in the art or redundant descriptions on substantially the same configurations may be omitted. The terms 'unit', 'module', 'member', or 'block' used herein may be implemented using a software or hardware component. According to an exemplary embodiment, a plurality of 'units', 'modules', 'members', or 'blocks' may also be implemented using an element and one 'unit', 'module', 'member', or 'block' may include a plurality of elements.

Throughout the specification, when an element is referred to as being "connected to" another element, it may be directly connected to the other element or indirectly connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, it will be understood that when one element, is referred to as being "on" another element, it can be directly on the other element, or intervening elements may also be present therebetween.

In this specification, terms "first", "second", etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the disclosure will be described with reference to the accompanying drawings.

FIG. 1 is a perspective view illustrating a display apparatus according to an exemplary embodiment.

Referring to FIG. 1, a display apparatus 100 according to an exemplary embodiment may include an exterior housing 99, a display panel 120, a support 98, and legs 97.

The exterior housing 99 defines an exterior appearance of the display apparatus 100 and includes components of the display apparatus 100 used to display various images or perform various functions. The exterior housing 99 may be formed as a single piece or as a combination of a plurality of housings, e.g., a combination of a front housing and a rear housing. An intermediate housing may further be provided inside the exterior housing 99.

The display panel 120 may be provided on the front surface of the exterior housing 99 and display various images. Specifically, the display panel 120 may display at least one or more still images or moving images. The display panel 120 may also be implemented using separate components such as a touch panel, depending on an embodiment.

The support 98 serves to connect the exterior housing 99 with the legs 97 while supporting the exterior housing 99. The support 98 may have various shapes according to designer's selection or may be omitted, depending on an embodiment. The support 98 may be attached to or detached from the exterior housing 99, depending on an embodiment.

The legs 97 may be connected to the support 98 such that the exterior housing 99 is stably mounted on the floor. The legs 97 may be coupled to or separated from the support 98, depending on an embodiment. The legs 97 may be directly connected to the exterior housing 99. According to another exemplary embodiment, the legs 97 may be omitted.

Meanwhile, the display panel 120 may provide a user with a three-dimensional (3D) image. Specifically, the display panel 120 may display a left-eye image perceived by a left eye of the user and a right-eye image perceived by a right eye of the user. In this regard, although the left-eye image and the right-eye image are related to each other, they may indicate different images. When the user perceives the left-eye image and the right-eye image respectively by the left eye and the right eye, a brain of the user recognizes a 3D image with the stereoscopic effect by fusing the plane images.

Figure 2A:
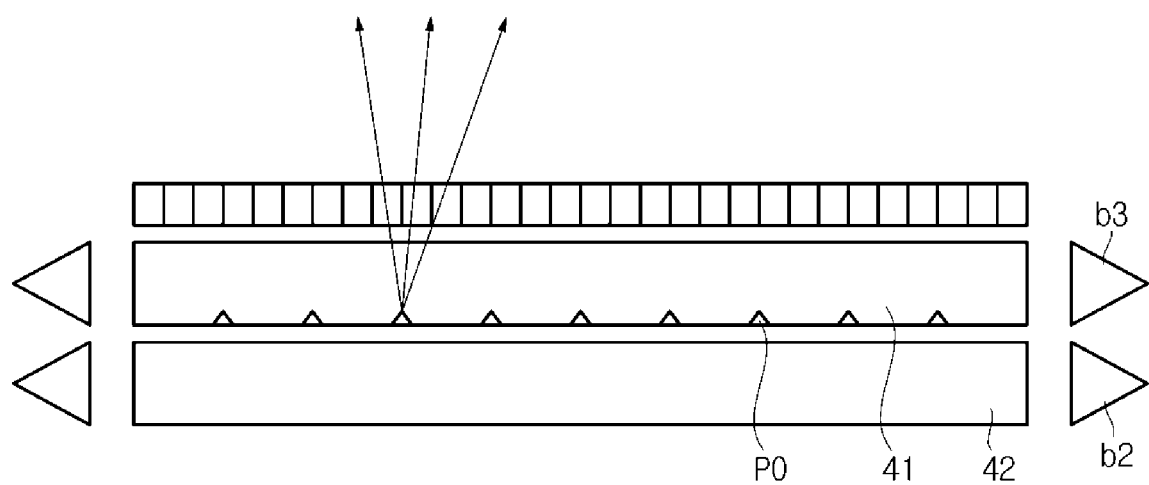
FIGS. 2A and 2B are conceptual diagrams illustrating a conventional back light apparatus and a back light apparatus according to an exemplary embodiment.
Figure 2B:
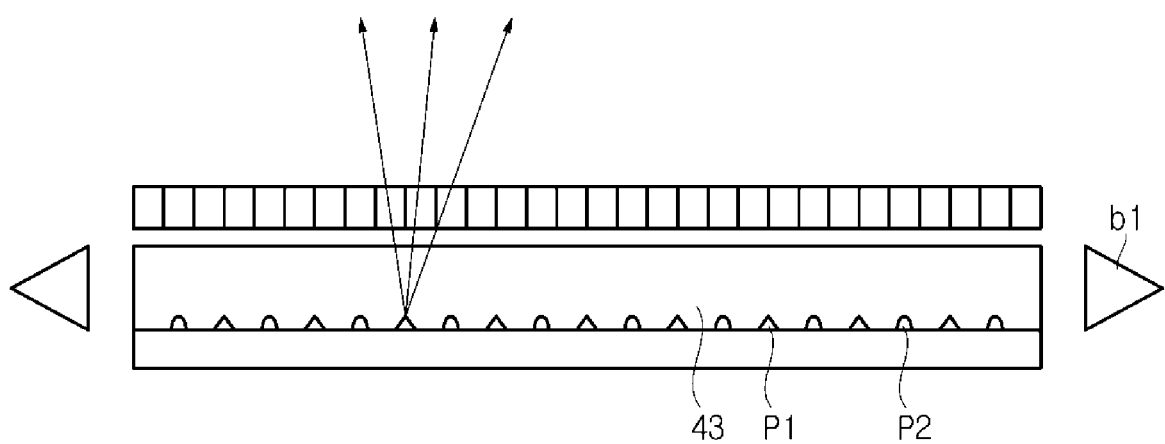

FIGS. 2A and 2B are conceptual diagrams illustrating a conventional back light apparatus and a back light apparatus according to an exemplary embodiment.

FIG. 2A is a conceptual diagram of a conventional back light apparatus to realize a two-dimensional (2D) or 3D image.

Referring to FIG. 2A, the conventional back light apparatus requires two pieces of light guide plates 41 and 42. That is, a 3D light guide plate 41 is used to display a 3D image and a 2D light guide plate 42 is used to display a 2D image. In addition, the light guide plates 41 and 42 are respectively provided with light sources b3 and b2 corresponding thereto. Thus, two light guide plates 41 and 42 and a plurality of light sources b2 and b3 are used to display 2D images and 3D images. In addition, since the back light apparatus shown in FIG. 2A has a predetermined pattern P0 that determines the direction of light, it is difficult to control a viewing point of the user and resolution.

FIG. 2B is a conceptual diagram of a back light apparatus according to an exemplary embodiment. Referring to FIG. 2B, the back light apparatus of FIG. 2B includes a light guide plate 43 having a plurality of patterns. The back light apparatus shown in FIG. 2B may include a first pattern part P1 and a second pattern part P2 activated based on a command of the user. When the user inputs a command to represent a 3D image, the display apparatus may display the 3D image by activating the first pattern part P1 or the second pattern part P2 of the back light apparatus. In addition, when the user inputs a command to represent a 2D image, the display apparatus may display the 2D image by activating both the first pattern part P1 and the second pattern part P2 of the back light apparatus.

Meanwhile, the user may adjust the viewing point and the resolution by using one light guide plate 43 via a command to control the first pattern part P1 and the second pattern part P2 provided in the back light apparatus. That is, upon comparison between the back light apparatus shown in FIG. 2A and the back light apparatus shown in FIG. 2B, while the back light apparatus of FIG. 2A displays a 2D image and a 3D image by using the two light guide plates 41 and 42 and the two light sources b3 and b2 illustrated in FIG. 2A, the back light apparatus of FIG. 2B displays a 2D image and a 3D image by using one light guide plate 43.

Methods of controlling 2D images, 3D images, resolution of images, and viewing points of images are obvious to one of ordinary skill in the art, and thus detailed descriptions thereof will not be given herein.

Figure 3:
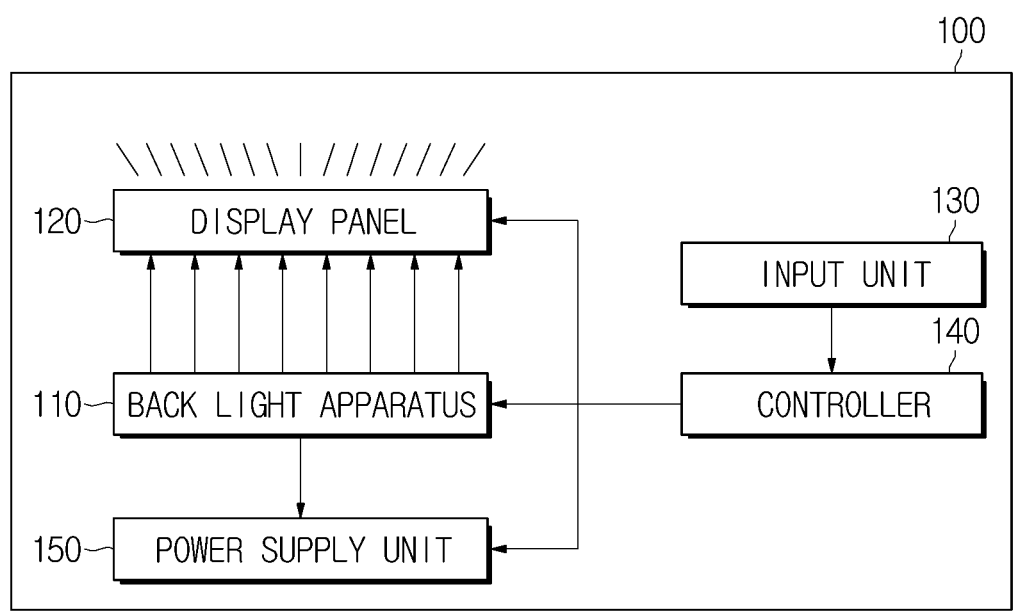
FIG. 3 is a control block diagram of a display apparatus according to an exemplary embodiment.

FIG. 3 is a control block diagram of a display apparatus according to an exemplary embodiment.

Referring to FIG. 3, the display apparatus may include an input unit 130, a back light apparatus 110, a display panel 120, and a controller 140.

The input unit 130 may receive a command from the user. The user may input a command to display a 3D image and a command to display a 2D image via the input unit 130. In addition, when the command to display the 3D image is input, a command related to the resolution of a screen or a command related to an observation point of a 3D image may be input via the input unit 130.

The controller 140 may allow the display panel 120 to display a predetermined still image or moving image by controlling the display panel 120 or the like. The controller 140 may be implemented using a processor. The processor may be implemented using one or more semiconductor chips and various parts for the operation of the semiconductor chips. Meanwhile, the display apparatus 100 may further include a storage unit to store various data to assist the operation of the processor. The storage unit may include at least one type of storage medium selected from a flash memory type, a hard disk type, a multimedia card micro type, a card type memory (e.g., secure digital (SD) or extreme digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk.

Meanwhile, the controller 140 may control the back light apparatus based on the command received via the input unit 130. Specifically, when the user inputs a command related to a 3D image, the controller 140 may drive the first pattern part or the second pattern part to display the 3D image on the display panel 120. Meanwhile, when the user inputs a command related to a 2D image, the controller 140 may simultaneously drive the first pattern part and the second pattern part to display the 2D image. The operation related thereto will be described in more detail later.

A power supply unit 150 may supply the power required to output an image to the back light apparatus 110 or the display panel 120. The power supply unit 150 may be connected to an external commercial power supply. In this case, the power supply unit 150 may rectify alternating current (AC) power supplied from the commercial power supply to direct current (DC) power to operate the display apparatus 100, change voltage to a desired level, or remove noise in the DC power supply. The power supply unit 150 may also be implemented by including a battery capable of storing power according to an exemplary embodiment. In addition, the power supply unit 150 may drive at least one of the first pattern part and the second pattern part by selectively driving an optical device provided in the back light apparatus 110.

The back light apparatus 110 generates light according to electric power supplied thereto and emits the generated light toward the display panel 120. The back light apparatus 110 may be implemented using a light emitting device configured to emit light in accordance with the supplied electric power such as a light emitting diode and a diffuser sheet or a light guide plate configured to allow the emitted light to be sufficiently incident on the entire surface of the display panel 120. The back light apparatus 110 will be described in more detail later.

The display panel 120 may generate an image by using incident light. According to another exemplary embodiment, the display panel 120 may adjust the emitted light by using liquid crystals. The display panel 120 may be a cathode ray tube (CRT), a digital light processing (DLP) panel, a plasma display penal, a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, without being limited thereto. The display panel may display a 2D image and a 3D image based on a command of the user.

At least one component may be added or deleted corresponding to performance of the components of the display apparatus illustrated in FIG. 3. In addition, it will be readily understood by those skilled in the art that mutual positions of the components may be changed to correspond to performance or structure of a system.

Meanwhile, each of the components illustrated in FIG. 3 may indicate a software component and/or a hardware component such as field programmable gate array (FPGA) and application specific integrated circuit (ASIC).

Figure 4:
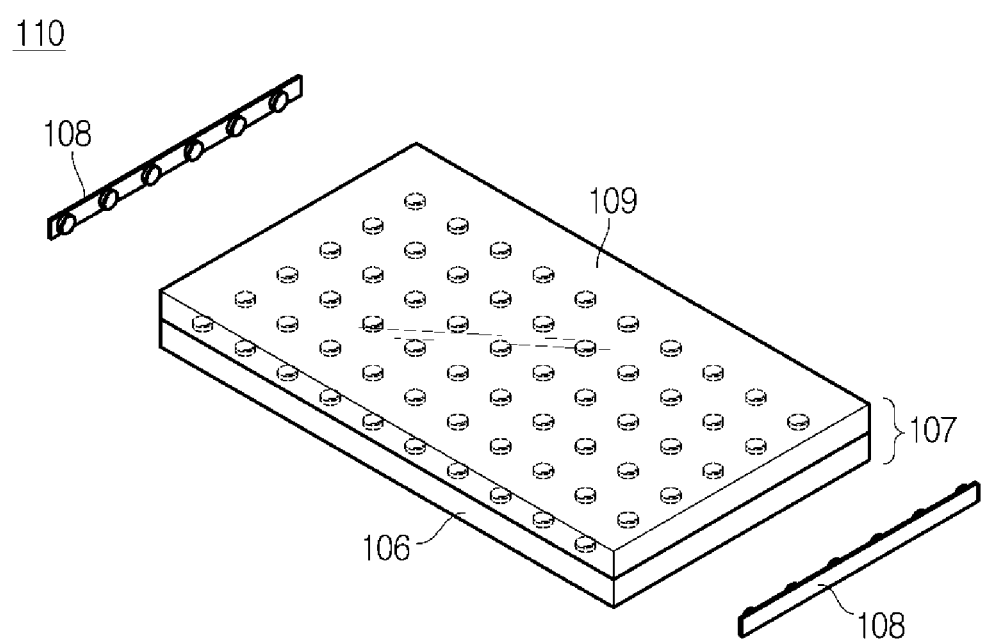
FIG. 4 is a diagram illustrating a configuration of a back light apparatus according to an exemplary embodiment.

FIG. 4 is a diagram illustrating the configuration of a back light apparatus according to an exemplary embodiment.

Referring to FIG. 4, the back light apparatus 110 may include a light guide plate 109, light sources 108 disposed at both sides of the light guide plate 109, and a light guide part 107.

The light source 108 may include a plurality of light emitting diodes (LEDs) configured to generate light and an LED cover on which the plurality of LEDs is arranged.

The plurality of LEDs may be aligned in one direction. The LED cover may cover the plurality of LEDs and have a structure in which one side is open. That is, the LED cover has an opening at one side. Light generated by the plurality of LEDs may be transmitted to the light guide plate 109 via the opening.

The light guide plate 109 may have a rectangular plate shape. The light guide plate 109 may have a light-incident surface on which light is incident, a light-emitting surface through which light is emitted, and a light-reflective surface facing the light-emitting surface.

The light-incident surface may be defined as one of side surfaces of the light guide plate 109. Since the light source 108 is disposed at one side of the light guide plate 109 according to the exemplary embodiment of the disclosure, one light-incident surface is defined for descriptive convenience. However, when the light sources 108 are disposed at one side and the opposite side of the light guide plate 109, the light-incident surfaces may also be disposed at the one side and the opposite side of the light guide plate 109 corresponding thereto. However, the exemplary embodiment is not limited thereto, and a plurality of light-incident surfaces may also be formed.

The light-incident surface is provided on one surface of the light guide plate 109 adjacent to the light source 108 such that light emitted from the light source 108 enters the light guide plate 109 through the light-incident surface.

Light incident on the light-incident surface may be totally reflected by the light-reflective surface and the light-emitting surface.

Since light from the light source 108 is reflected at various angles, uniform light may be supplied to the display panel.

The light guide part 107 may include first and second pattern parts P1 and P2.

Light emitted from the plurality of LEDs arranged in one direction may be refracted, reflected, and scattered by a pattern part P of the light guide plate 109 and uniformly transmitted to the display panel through the light-emitting surface. The pattern part may be provided on the light-reflective surface.

The pattern part may be formed parallel to the light source 108. Since the light source 108 according to an exemplary embodiment is formed of a plurality of LEDs aligned in one direction, the pattern part may be arranged in a direction parallel to the plurality of LEDs. The pattern part may also be provided parallel to the light-incident surface. Specifically, the light source 108 may include the plurality of LEDs aligned in a first direction on at least one side of the light guide plate 109 to be spaced apart from each other and the pattern part may be formed in the first direction.

The pattern part may be provided such that a lengthwise direction thereof is the first direction in which the plurality of LEDs are arranged.

The pattern part may include a first pattern part P1 and a second pattern part P2. Expressions of the first pattern part P1 and the second pattern part P2 are used to divide the pattern part. The first pattern part P1 and the second pattern part P2 may transmit light emitted from a region activated by an optical device which will be described later. The 3D image may be realized when light is emitted through the first pattern part P1 or the second pattern part P2, and the 2D image may be realized when light is emitted through both the first pattern part P1 and the second pattern part P2. Also, the first pattern part P1 and the second pattern part P2 may adjust the resolution of the image displayed on the display panel. In addition, when a 3D image is displayed on an image panel, a position where the 3D image is visually perceived is predetermined and the position is referred to as a viewing point. The viewing point may also be controlled by adjusting a pitch between the first pattern part P1 and the second pattern part P2 and controlling the operation of the first and second pattern parts P1 and P2.

Since the light guide part 107 includes the above-described first and second parts P1 and P2, light may be emitted in the first and second directions.

Meanwhile, the light guide part 107 may include an optical device. The optical device is a device configured to selectively emit light based on a command of the user and may have first and second regions corresponding to the first and second parts P1 and P2, respectively. When the user desires to emit light through the first pattern part P1, light is emitted only through the first region of the optical device since light is emitted through the first pattern part P1 corresponding to the first region, an operation effect of the back light apparatus having the first pattern part P1 may be obtained. Meanwhile, when the user desires to emit light through the second pattern part P2, light is emitted only through the second region of the optical device. Since light is emitted through the second pattern part P2 corresponding to the second region, an operation effect of the back light apparatus having the second pattern part P2 may be obtained.

Also, when the user desires to emit light through both the first and second parts P1 and P2, light may be emitted through the first and second parts P1 and P2 through the first and second regions. As a result, by using the two first and second parts P1 and P2 and the optical device having the first and second regions corresponding thereto, effects of a plurality of guide plates may be obtained with one light guide part 107 and one light guide plate 109. Accordingly, both 2D images and 3D images may be acquired by using one light guide plate. The operation related to the optical device will be described in more detail later.

Meanwhile, widths and pitches of the first pattern part P1 and the second pattern part P2 may be adjusted based on predetermined values by the user during a manufacturing process and detailed descriptions thereof will be given later.

Figure 5A:
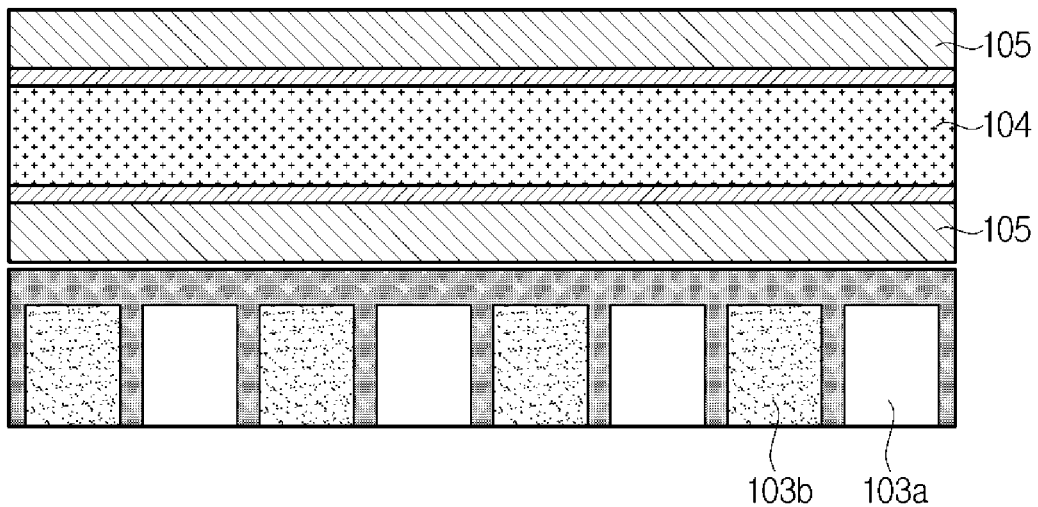
FIGS. 5A and 5B are diagrams illustrating a configuration of an optical device according to an exemplary embodiment.
Figure 5B:
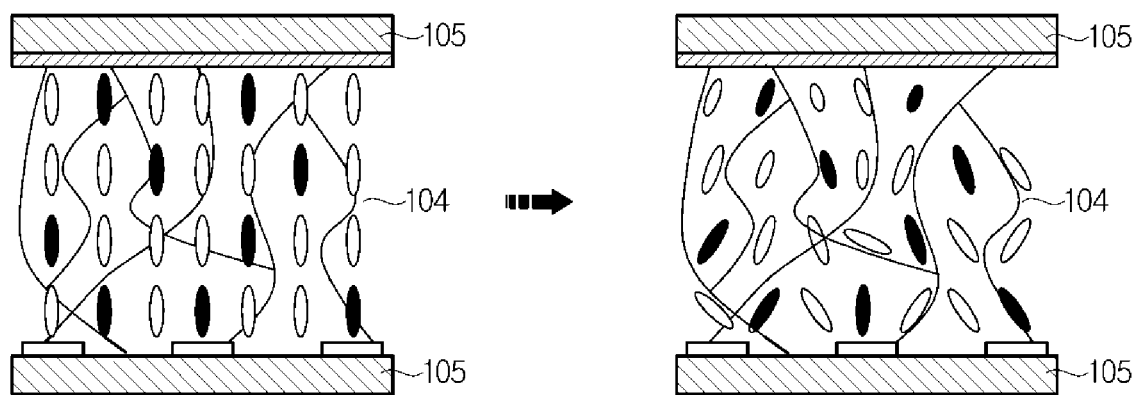

FIGS. 5A and 5B are diagrams illustrating the configuration of an optical device according to an exemplary embodiment.

FIG. 5A illustrates an optical device 106 according to an exemplary embodiment. The optical device 106 includes a pair of panels 105 and a liquid crystal unit 104 injected between the panels 105.

One of the panels 105 includes a plurality of thin film transistors (TFTs) disposed in a matrix form and the other panel includes a common electrode formed of indium tin oxide (ITO).

Referring to FIG. 5A, the optical device may have a first region and a second region and include a first electrode 103a and a second electrode 103b corresponding to the first region and the second region, respectively. In addition, the liquid crystal unit 104 may operate differently according to the power supplied to the first electrode 103a and the second electrode 103b. For example, when the power is supplied to the first electrode 103a, only the first region of the liquid crystal unit corresponding to the first electrode 103a is activated and light is emitted through the first region. As another example, when the power is supplied to both the first electrode 103a and the second electrode 103b, both the first region and the second region corresponding to the first electrode 103a and the second electrode 103b are activated and light is emitted through the first region and the second region. Both the first electrode 103a and the second electrode 103b may be configured with the above-described TFTs and the common electrode formed of ITO.

FIG. 5B illustrates the liquid crystal unit 104 that operates in a different manner in accordance with the power supplied thereto.

Liquid crystals have light transmitting properties in a transmission mode and an arrangement of the liquid crystals have light scattering properties in a scattering mode. When the power is supplied to the liquid crystals, the scattering mode may be switched to the transmission mode or the transmission mode may be switched to the scattering mode. The liquid crystal unit 104 may have the first region corresponding to the first electrode 103a and the second region corresponding to the second electrode 103b. Thus, when the power is supplied only to the first electrode 103a, the mode of the liquid crystal unit 104 may be switched in the first region. When the power is supplied only to the second electrode 103b, the mode of the liquid crystal unit 104 may be switched in the second region. When the power is supplied to both the first and second electrodes 103a and 103b, the mode of liquid crystals corresponding to the first and second regions may be switched. Based on the above-described operation, effects of using two light sources may be obtained by using one light source.

Figure 6A:
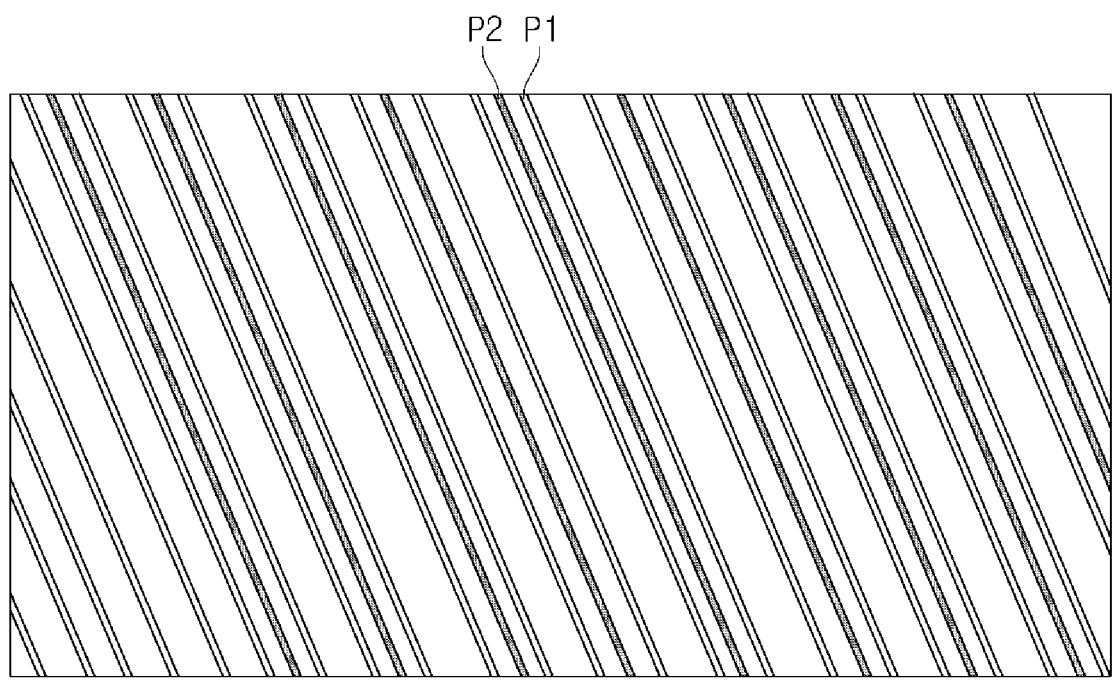
FIGS. 6A and 6B are views illustrating a first pattern part and a second pattern part applied to a back light apparatus according to an exemplary embodiment.
Figure 6B:
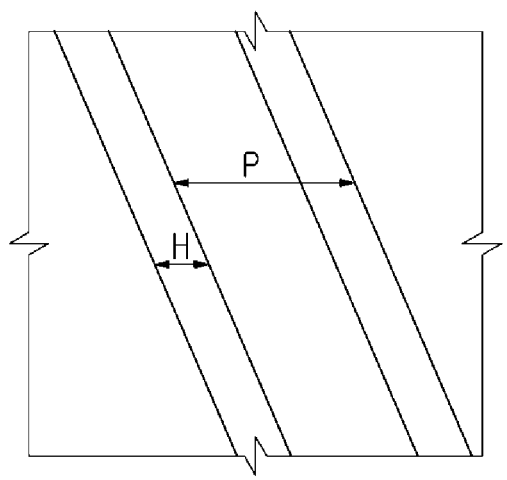
Figure 7:
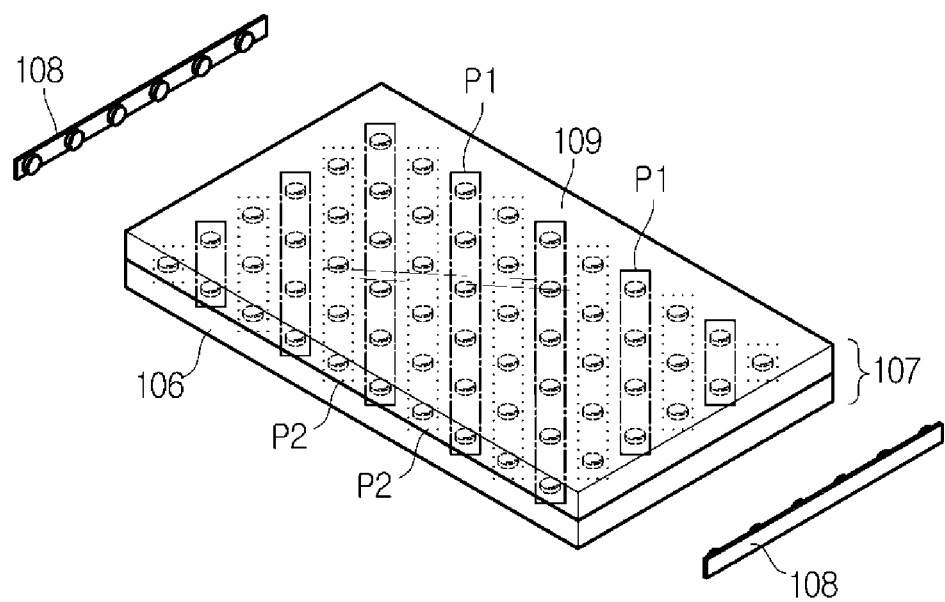
FIG. 7 is a diagram illustrating that first and second pattern parts according to an exemplary embodiment correspond to an optical device.

FIGS. 6A and 6B are views illustrating the first and second parts P1 and P2 applied to the back light apparatus 110 according to an exemplary embodiment. FIG. 7 is a view illustrating that the first and second parts P1 and P2 according to an exemplary embodiment correspond to the optical device.

FIG. 6A illustrates the pattern parts according to an exemplary embodiment.

Although the first pattern part P1 is illustrated in a different shape from that of the second pattern part P2 in FIG. 6A for distinction therebetween, these patterns may be configured in the same manner. Pattern parts having the same inclination angle may be arranged in an array at regular pitches and may selectively serve as a scatterer by operating together with the optical device 106 as described above. By controlling the operation of the first pattern part P1 and the second pattern part P2, the viewing point and resolution of the 3D image may be adjusted and the 2D image may also be represented. Specifically, the 3D image may be realized by selectively driving the first pattern part P1 or the second pattern part P2 and the first pattern part P1 and the second pattern part P2 may be selectively driven based on the resolution and the number of viewing points. In addition, since a lot of patterns are required to realize a 2D image, both of the first pattern part P1 and the second pattern part P2 may be driven.

FIG. 6B is an enlarged view of a portion of FIG. 6A.

Referring to FIG. 6B, each of the first pattern part P1 and the second pattern part P2 may be fabricated on the basis of a pitch and a width of a unique pattern. Each of the first pattern part P1 and the second pattern part P2 may be configured with a first unit pattern and a second unit pattern respectively having a pitch and a width which will be described later. Each of the unit patterns may be configured with a group of straight lines with a constant width. A pattern pitch P may be derived by Equation 1 below.

$$P = \frac{LT \times VD \times PP}{VD} \qquad \text{Equation 1}$$

In Equation 1, P is a pattern pitch indicating an interval between patterns and LT is a thickness of the light guide plate. In addition, PP is a pixel pitch indicating an interval between pixels displayed on the display panel. VD is a viewing distance indicating a distance from the display panel to eyes of the user.

Meanwhile, the pattern width may be derived by Equation 2 below.

$$H = \frac{P}{NVP} \qquad \text{Equation 2}$$

In Equation 2, H is a pattern width indicating a width of the pattern and P is the pattern pitch described above. In addition, NVP is the number of viewing points indicating the number of positions where a 3D image may be observed. As described above, the pattern pitch and the pattern width may vary in accordance with the resolution and size of the realized 3D image and may also be modified according to the thickness of the light guide plate.

Referring back to FIG. 6A, the first pattern part P1 and the second pattern part P2 may operate simultaneously. In another example, when only the first pattern part P1 operates, the pitch decreases by the second pattern part P2 so that a 3D image having a small number of viewing points and having a high resolution may be realized. Thus, this case is suitable for an in-person viewing mode. When only the second pattern part P2 operates, the pattern pitch increases so that a 3D image having a large number of viewing points and a low resolution may be implemented. Thus, a plurality of users may view the 3D image. Although the operation according to the disclosure performed by using two patterns has been described above, the descriptions are given by way of example. It may also be possible to design a pattern having various types of resolutions and viewing points by increasing the number of patterns.

Therefore, the back light apparatus including the first pattern part P1 and the second pattern part P2 may be fabricated by those of ordinary skill in the art based on the above descriptions. Since setting the pattern pitch and the pattern width is obvious to one of ordinary skill in the art, detailed descriptions thereof will not be given herein.

FIG. 7 is a diagram illustrating that the first and second pattern parts according to an exemplary embodiment correspond to the optical device.

Referring to FIG. 7, the back light apparatus 110 and the pattern part illustrated in FIG. 4 are illustrated. When the user desires to realize a 3D image, the 3D image may be realized on the display panel by driving either the first pattern part P1 or the second pattern part P2. When the user desires to realize a 2D image, the 2D image may be realized by driving both the first pattern part P1 and the second pattern part P2. Meanwhile, the 3D image may also be realized by selectively driving the first pattern part P1 or the second pattern part P2 based on a command of the user. The pattern part and the back light apparatus 110 illustrated in FIG. 7 are merely examples of an exemplary embodiment, and the shapes of the patterns are not limited to those illustrated in FIG. 7.

Figure 8A:
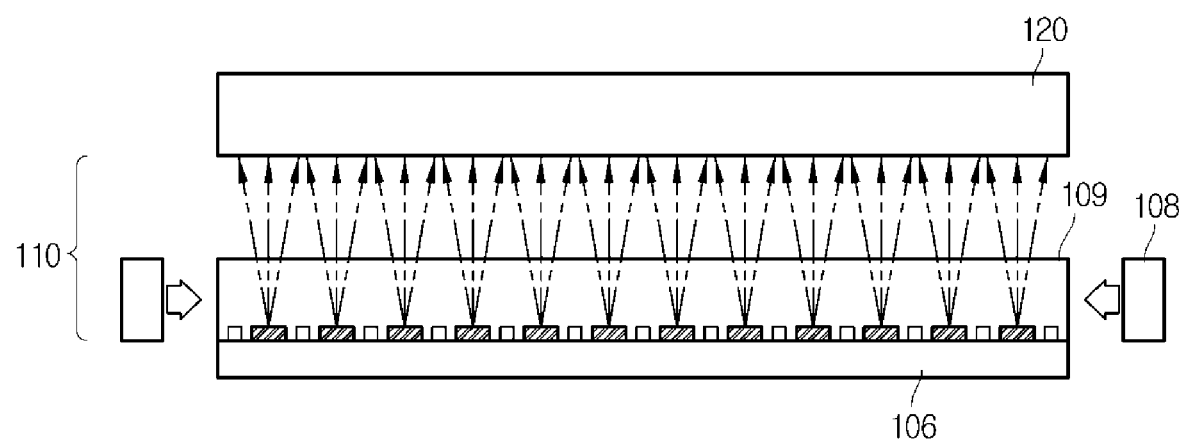
FIGS. 8A and 8B are schematic diagrams illustrating optical paths of a display apparatus according to an exemplary embodiment.
Figure 8B:
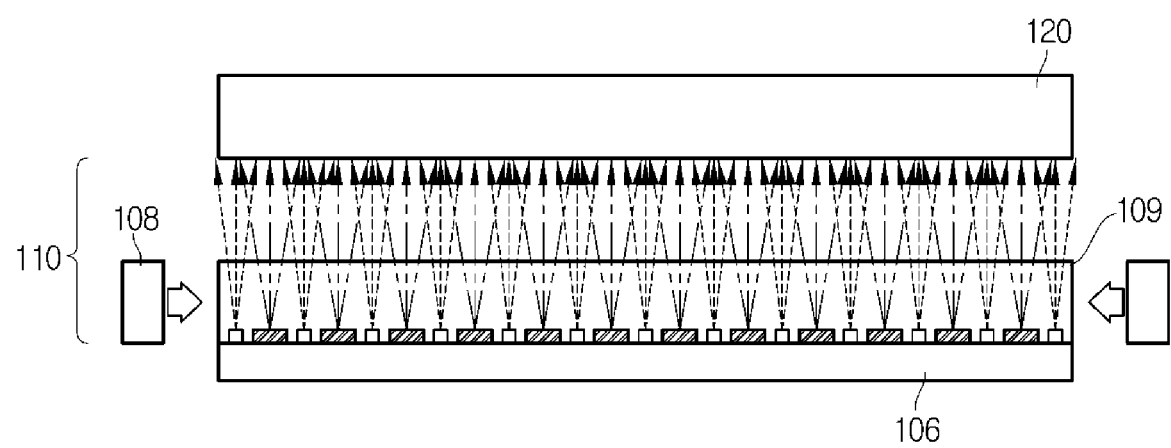

FIGS. 8A and 8B are schematic diagrams illustrating optical paths of a display apparatus according to an exemplary embodiment.

FIG. 8A illustrates an optical path of a display apparatus having a back light apparatus in a 3D image display mode.

The display apparatus emits light by driving a plurality of light sources 108 provided in the back light apparatus 110.

In this case, light emitted from the plurality of light sources 108 is incident on the light guide part 107. The light guide part 107 may have the first pattern part P1 and the second pattern part P2. Light emitted from the light source 108 may proceed in the first direction when emitted through the first pattern part P1 and proceed in the second direction when emitted through the second pattern P2. The light emitted in the first or second direction may realize a 3D image by the operation which will be described later. The user may determine whether to emit light either in the first direction or the second direction in accordance with the viewing point of the user and the resolution of the screen. For example, when the pitch of the first pattern part P1 is smaller than that of the second pattern part P2, the user may emit light in the first direction by driving only the first pattern part P1 and realize an image having a high resolution and a limited number of observation viewing points. Based on the above descriptions, the display panel may display a 3D image by using light incident either in the first direction of the second direction.

FIG. 8B illustrates an optical path of a display apparatus having a back light apparatus in a 2D image display mode.

The display apparatus emits light by driving a plurality of light sources 108 provided in the back light apparatus 110.

In this case, light emitted from the plurality of light source 108 is incident on the light guide part 107. The light guide part 107 may have the first pattern P1 and the second pattern P2. Light emitted from the light source 108 may proceed in the first direction when emitted through the first pattern part P1 and proceed in the second direction when emitted through the second pattern part P2. In case of the 2D image, light needs to be emitted via a narrower pattern than that of the 3D image. Thus, in order to realize the 2D image, a pattern having a narrower pitch than that of the 3D image may be formed by driving both the first pattern part P1 and the second pattern part P2. The display panel 120 displays the 2D image by using the incident light.

Figure 9:
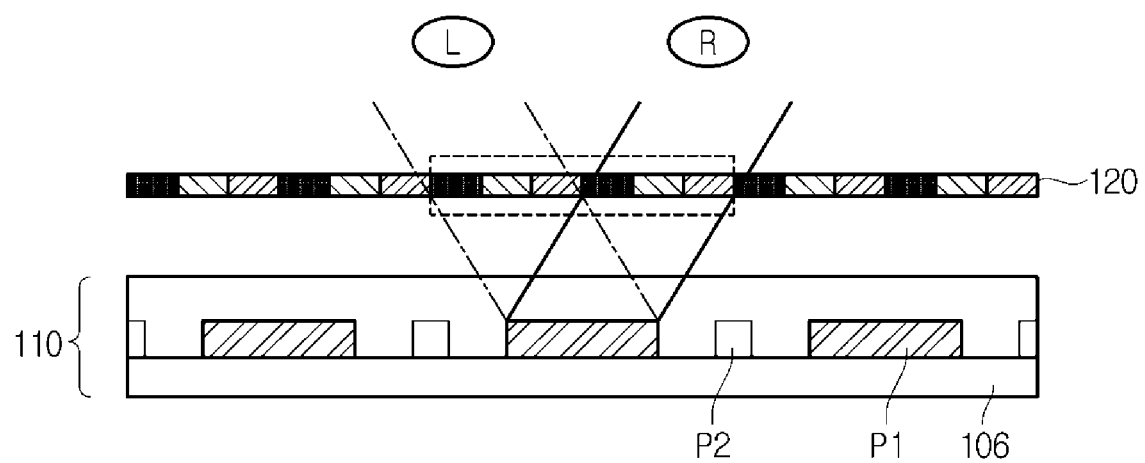
FIG. 9 is an exemplary diagram of displaying a three-dimensional (3D) image having viewing points according to an exemplary embodiment.

FIG. 9 is an exemplary diagram of displaying a 3D image having viewing points according to an exemplary embodiment.

FIG. 9 exemplarily illustrates that the display apparatus displays a 3D image that may be viewed at two viewing points.

When a 2D image is displayed, one unit pixel of the display panel 120 may be allocated as one pixel for displaying one viewing point image.

Pixels may be allocated such that a left-eye image and a right-eye image are alternately displayed in a horizontal direction. Thus, a combination of two unit pixels for displaying the 2D image in the horizontal direction may be set as one unit pixel (one voxel) for a 3D image.

In addition, the pattern part may be disposed at the center of one voxel.

When light reflected by the pattern part is incident in a state where two viewing point images (left-eye image L and right-eye image R) are allocated to each pixel of the display panel 120, the left-eye image and the right-eye image generated by the incident light arrive at the left eye and the right eye of the user, respectively.

As described above, the pattern part according to an exemplary embodiment includes the first pattern part P1 and the second pattern part P2 and a 3D image may be displayed based on the operation of the first pattern part P1 and the second pattern part P2.

According to an exemplary embodiment, a display apparatus displaying a 3D image having four viewing points is described.

The display panel 120 includes a plurality of pixels including red, green, and blue pixels (RGB). The plurality of pixels may be arranged in a matrix form in a first direction (e.g., vertical direction) and a second direction (e.g., horizontal direction).

In this case, a 2D image may be displayed by using color cells (RGB) consecutively arranged in the horizontal direction.

When light reflected by the pattern part is incident on each pixel in a state where four channels are allocated to each pixel of the display panel 120, a first channel image, a second channel image, a third channel image, and a fourth channel image generated by the light incident on each pixel may be displayed correspondingly to each viewing angle direction.

Here, the first channel image, second channel image, third channel image and fourth channel image may be consecutively displayed.

Accordingly, the user may view the 3D image at various positions.

Figure 10:
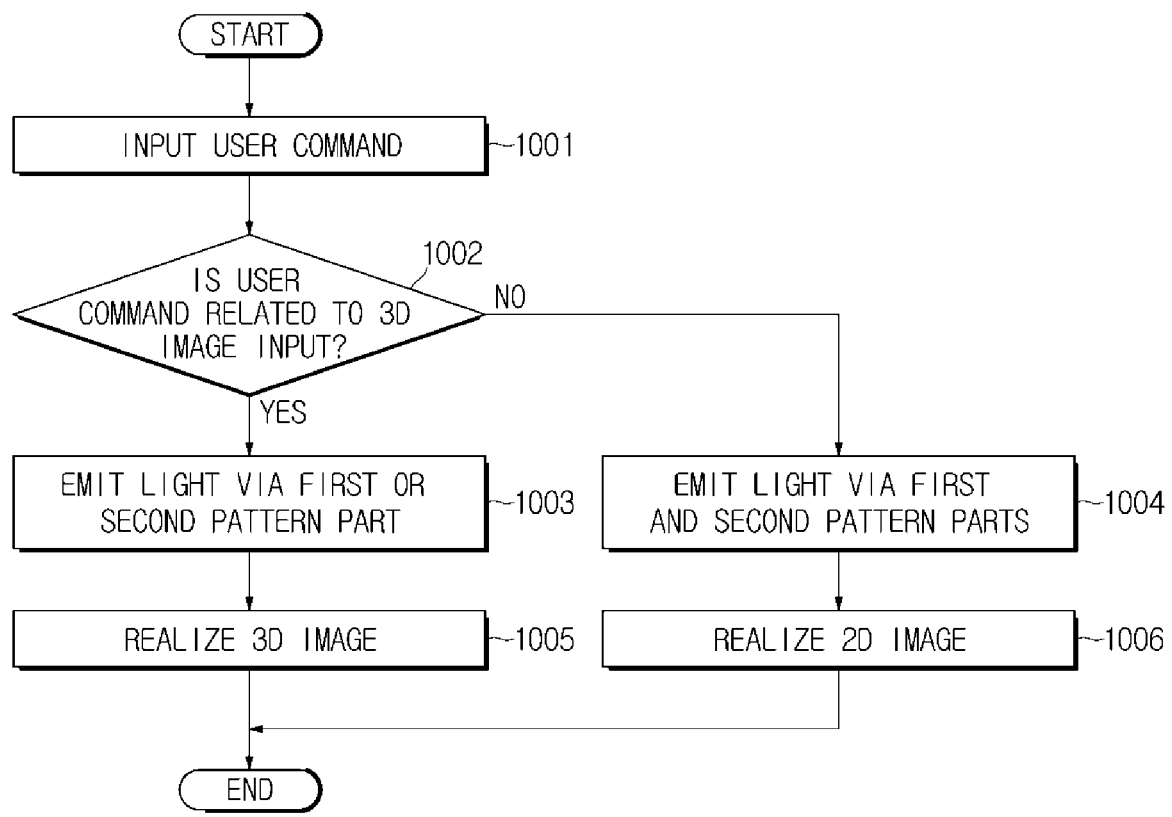
FIGS. 10, 11 and 12 are flowcharts according to an exemplary embodiment.
Figure 11:
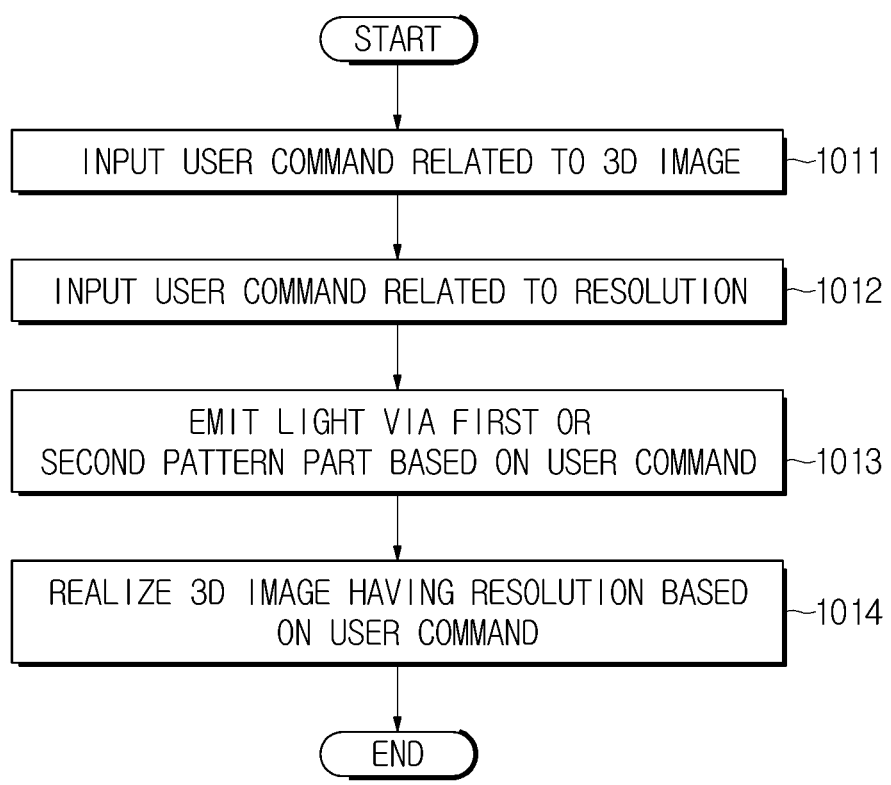

FIGS. 10 and 11 are flowcharts according to an exemplary embodiment.

Referring to FIG. 10, the user may input a user command related to a 3D image or 2D image (1001). When the user command is a command related to a 3D image (1002), light may be emitted via either the selected first pattern part or second pattern part as described above (1003) and a 3D image may be realized based thereon (1005). On the other hand, when the user command is a command related to a 2D image, light may be emitted via both the first pattern part and the second pattern part (1004) and a 2D image may be realized based thereon (1006).

Referring to FIG. 11, when the user inputs a command related to a 3D image (1011), the 3D image may be realized by light emitted through either the first pattern part or the second pattern part as described above. In addition, the user may adjust the resolution of the 3D image in the case of realizing the 3D image (1012). Since the resolution may be adjusted based on a pattern pitch, the user may input a command related to the resolution and the first pattern part or the second pattern part may be driven based on the command related to the resolution (1013) to realize the 3D image (1014). For example, when the first pattern part has a narrower pitch, a 3D image having a higher resolution may be realized by driving the first pattern part. When the second pattern part has a wider pitch, a 3D image having a lower resolution may be realized by driving the second pattern part.

Figure 12:
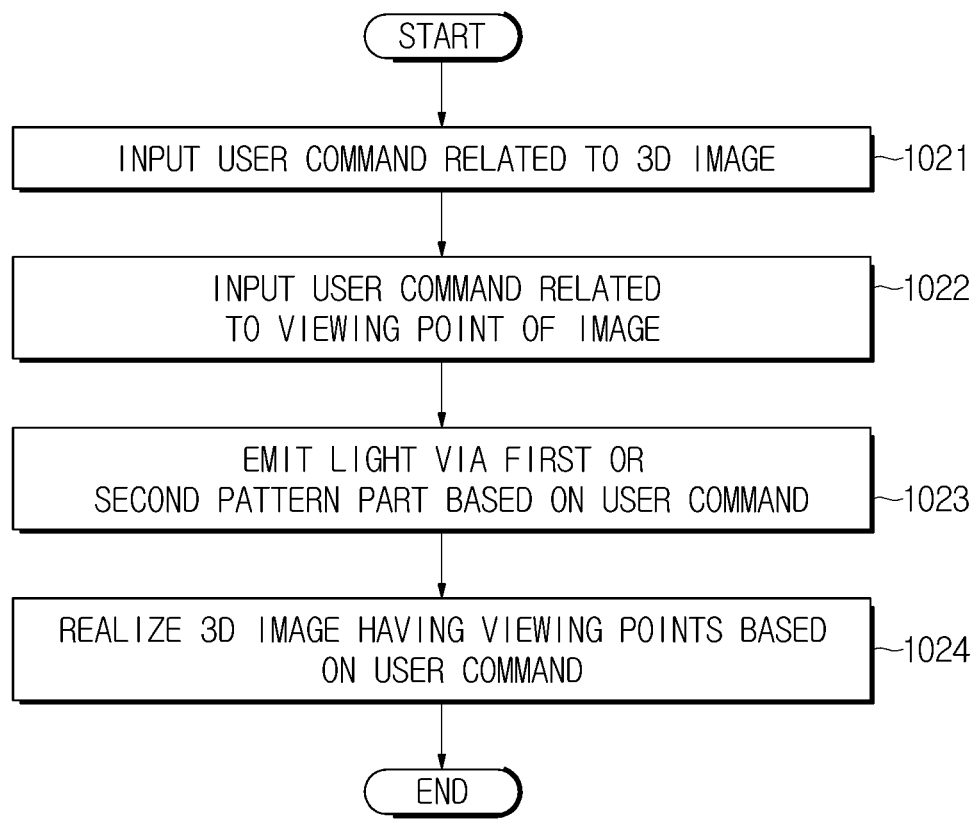

Referring to FIG. 12, when the user inputs a command related to a 3D image (1021), the 3D image may be realized by light emitted through either the first pattern part or the second pattern part as described above. In addition, in case of realizing the 3D image, the viewing point where the 3D image is visually perceived by the user may be adjusted (1022). Since the viewing point may be adjusted based on the pattern pitch, the user may input a command related to the viewing point and the first pattern part or the second pattern part may be driven based on the viewing point command of the user (1023) to realize the 3D image based on the viewing point command of the user (1024). For example, when the first pattern part has a narrower pitch, a 3D image having a smaller number of viewing points may be realized. When the second pattern part has a wider pitch, a 3D image having a large number of viewing points may be realized.

Meanwhile, the aforementioned embodiments may be embodied in the form of a recording medium storing instructions executable by a computer. The instructions may be stored in the form of program codes and perform the operation of the disclosed embodiments by creating a program module when executed by a processor. The recording medium may be embodied as a computer readable recording medium.

The computer readable recording medium includes all types of recording media that store instructions readable by a computer such as read only memory (ROM), random access memory (RAM), magnetic tape, magnetic disc, flash memory, and optical data storage device.

As is apparent from the above description, according to the back light apparatus, the display apparatus including the same, and the method of controlling the display apparatus, a 2D image and a 3D image with no glasses may be implemented using one light guide plate.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A back light apparatus comprising:
a plurality of light sources configured to generate light; and
a light guide part, wherein the light guide part comprises:
a light guide plate configured to change a path of the light;
a first pattern part disposed on a first surface of the light guide plate and configured to emit the light in a first direction;
a second pattern part disposed on the first surface of the light guide plate and configured to emit the light in a second direction; and
an optical device disposed adjacent to a light-reflective surface of the light guide plate and having a first region corresponding to the first pattern part and a second region corresponding to the second pattern part,
wherein the optical device activates at least one of the first region and the second region and emits the light in at least one of the first direction and the second direction,
wherein the optical device comprises a first electrode corresponding to the first region and a second electrode corresponding to the second region, the first region and the second region being disposed on a second surface and being spaced apart from each other,
wherein the light guide part changes the path of the light emitted based on electric power supplied to at least one of the first electrode and the second electrode, and emits the light toward the light-emitting surface of the light guide plate,
wherein the first pattern part comprises a plurality of first unit patterns arranged in parallel and spaced apart from each other at a predetermined first pitch, a first unit pattern having a preset first width, and the second pattern part comprises a plurality of second unit patterns arranged in parallel and spaced apart from each other at a predetermined second pitch, a second unit pattern having a preset second width, and
where each of the predetermined first pitch and the predetermined second pitch is determined based on a least one of a thickness of the light guide plate, an interval between pixels constituting the image, and a distance between the display panel and the user.

2. The back light apparatus according to claim 1, wherein the optical device comprises a liquid crystal unit activated based on the electric power supplied to at least one of the first electrode and the second electrode.

3. The back light apparatus according to claim 1, wherein the first pattern part comprises a plurality of first unit patterns arranged in parallel and spaced apart from each other at a predetermined first pitch, and
wherein the second pattern part comprises a plurality of second unit patterns spaced apart from each other at a predetermined second pitch.

4. A display apparatus comprising:
an input unit;
a back light apparatus configured to emit light;
a display panel configured to display an image using the light; and
a controller configured to display the image on the display panel by controlling a direction of the emitted light in response to a command of a user being input via the input unit,
wherein the back light apparatus comprises:
a plurality of light sources configured to generate the light; and
a light guide part, wherein the light guide part comprises:
a light guide plate configured to change a path of the light and emit the light;
a first pattern part disposed on a first surface of the light guide plate and configured to emit the light in a first direction; and
a second pattern part disposed on the first surface of the light guide plate and configured to emit the light in a second direction;
an optical device disposed adjacent to a light-reflective surface of the light guide plate and having a first region corresponding to the first pattern part and a second region corresponding to the second pattern part,
wherein the optical device activates at least one of the first region and the second region and emits the light in at least one of the first direction and the second direction,
wherein the optical device comprises a first electrode corresponding to the first region and a second electrode corresponding to the second region, the first region and the second region being disposed on a second surface and being spaced apart from each other,
wherein the light guide part changes the path of the light emitted based on electric power supplied to at least one of the first electrode and the second electrode, and emits the light toward the light-emitting surface of the light guide plate, wherein the first pattern part comprises a plurality of first unit patterns arranged in parallel and spaced apart from each other at a determined first pitch, a first unit patter having a preset first width, and the second pattern part comprises a plurality of second unit patterns arranged in parallel and spaced apart from each other at a predetermined second pitch, a second unit pattern having a preset second width, and wherein each of the predetermined first pitch and the predetermined second pitch is determined based on at least one of a thickness of the light guide plate, and interval between pixels constituting the image, and a distance between the display panel and the user.

5. The display apparatus according to claim 4, wherein, in response to a user command related to a three-dimensional (3D) image being input via the input unit, the controller displays the 3D image on the display panel by emitting the light in one of the first direction and the second direction.

6. The display apparatus according to claim 4, wherein, in response to a user command related to a two-dimensional (2D) image being input via the input unit, the controller displays the 2D image on the display panel by emitting the light in the first direction and the second direction.

7. The display apparatus according to claim 4, wherein, in response to a user command related to a 3D image and a command related to a viewing point of the image being input via the input unit, the controller displays the 3D image on the display panel by emitting the light in one of the first direction and the second direction.

8. The display apparatus according to claim 4, wherein, in response to a user command related to a resolution of the image being input via the input unit, the controller displays the image on the display panel by emitting the light in at least one of the first direction and the second direction.

9. The display apparatus according to claim 4, wherein each of the preset first width and the preset second width is determined based on a number of viewing points of the image and the predetermined first pitch or the predetermined second pitch respectively corresponding to the preset first width or the preset second width.

10. A method of controlling a display apparatus including a light guide part, the light guide part comprising a light guide plate configured to change a path of the light, a first pattern part disposed on a first surface of the light guide plate and configured to emit the light in a first direction, a second pattern part disposed on the first surface of the light guide plate and configured to emit the light in a second direction, and an optical device disposed adjacent to a light-reflective surface of the light guide plate and having a first region corresponding to the first pattern part and a second region corresponding to the second pattern part, the method comprising:

receiving a user command;

activating at least one of the first region corresponding to the first pattern part and the second region corresponding to the second pattern part;

emitting light in at least one of the first direction and the second direction in response to the user command; and displaying the image based on the emitted light, wherein the optical device comprises a first electrode corresponding to the first region and a second electrode corresponding to the second region, the first region and the second region being disposed on a second surface and being spaced apart form each other, wherein the light guide part changes the path of the light emitted based on electric power supplied to at least one of the first electrode and the second electrode, and emits the light toward the light-emitting surface of the light guide plate, wherein the first pattern part comprises a plurality of first unit patterns arranged in parallel and spaced apart from each other at a predetermined first pitch, a first unit pattern having a preset first width, and the second pattern part comprises a plurality of second unit patterns arranged in parallel and space apart from each other at a predetermined second pitch, a second unit pattern having a preset second width, and wherein each of the predetermined first pitch and the predetermined second pitch is determined based on a least one of a thickness of the light guide plate, an interval between pixels constituting the image, and a distance between the display panel and the user.

11. The method according to claim 10, wherein the receiving of the user command comprises receiving the user command related to a 3D image, and the displaying of the image comprises displaying the 3D image by emitting the light in one of the first direction and the second direction in response to the user command related to the 3D image.

12. The method according to claim 10, wherein the receiving of the user command comprises receiving the user command related to a 2D image, and the displaying of the image comprises displaying the 2D image by emitting the light in the first direction and the second direction in response to the user command related to the 2D image.

13. The method according to claim 10, wherein the receiving of the user command comprises receiving the user command related to a viewing point of the image, and the displaying of the image comprises displaying the image by emitting the light in one of the first direction and the second direction in response to the user command related to the viewing point of the image.

14. The method according to claim 10, wherein the receiving of the user command comprises receiving the user command related to a resolution of the image, and the displaying of the image comprises displaying the image by emitting the light in at least one of the first direction and the second direction in response to the user command related to the resolution of the image.

* * * * *